(12) United States Patent
Winkler

(10) Patent No.: US 12,142,077 B2
(45) Date of Patent: Nov. 12, 2024

(54) METHOD OF AUGMENTING A DATASET USED IN FACIAL EXPRESSION ANALYSIS

(71) Applicant: Opsis Pte., Ltd., Grace Park (SG)

(72) Inventor: Stefan Winkler, Singapore (SG)

(73) Assignee: Opsis Pte., Ltd., Grace Park (SG)

( * ) Notice: Subject to any disclaimer, the term of this patent is extended or adjusted under 35 U.S.C. 154(b) by 351 days.

(21) Appl. No.: 17/687,391

(22) Filed: Mar. 4, 2022

(65) Prior Publication Data
US 2023/0282028 A1 Sep. 7, 2023

(51) Int. Cl.
*G06K 9/00* (2022.01)
*G06T 7/00* (2017.01)
*G06V 40/16* (2022.01)

(52) U.S. Cl.
CPC ............ *G06V 40/174* (2022.01); *G06T 7/001* (2013.01); *G06V 40/168* (2022.01); *G06T 2207/20081* (2013.01); *G06T 2210/44* (2013.01)

(58) Field of Classification Search
CPC .... G06V 40/174; G06V 40/168; G06T 7/001; G06T 2207/20081; G06T 2210/44
See application file for complete search history.

(56) References Cited

U.S. PATENT DOCUMENTS

| | | | | |
|---|---|---|---|---|
| 9,547,763 B1 * | 1/2017 | Avital | ................ | H04L 63/0861 |
| 2004/0056857 A1 * | 3/2004 | Zhang | .................... | G06T 13/40 |
| | | | | 345/419 |
| 2006/0098027 A1 * | 5/2006 | Rice | .................. | H04M 3/42042 |
| | | | | 345/619 |
| 2007/0127844 A1 * | 6/2007 | Watanabe | ............ | G06V 40/171 |
| | | | | 382/276 |
| 2018/0314879 A1 * | 11/2018 | Khwaja | ............... | A61B 5/02108 |
| 2019/0289225 A1 * | 9/2019 | Vonikakis | ............ | H04N 5/2621 |

FOREIGN PATENT DOCUMENTS

| | | | | | |
|---|---|---|---|---|---|
| CN | 104732203 B | * | 3/2019 | | |
| GB | 2402311 A | * | 12/2004 | ......... | G06K 9/00288 |
| GB | 2588747 A | * | 5/2021 | ......... | G06K 9/00302 |
| KR | 20110021330 A | * | 4/2011 | | |
| WO | WO-2007068983 A1 | * | 6/2007 | ......... | A61B 38/1816 |
| WO | WO-2015015173 A1 | * | 2/2015 | ......... | G06K 9/00248 |

OTHER PUBLICATIONS

Empath: A Neural Network that Categorizes Facial Expressions, Matthew N. Dailey et al., 2002, pp. 1158-1173 (Year: 2002).*

(Continued)

*Primary Examiner* — Jayesh A Patel
(74) *Attorney, Agent, or Firm* — Muir Patent Law, PLLC

(57) ABSTRACT

In a computer-implemented method of augmenting a dataset used in facial expression analysis, a first facial image and a second facial image are added to a training/testing dataset and mapped to two respective points in a continuous dimensional emotion space. The position of a third point in the continuous dimensional emotion space between the first two points is determined. Augmentation is achieved when a labelled facial image is derived from the third point based on its position relative to the first and second facial expression.

14 Claims, 3 Drawing Sheets

(56) References Cited

OTHER PUBLICATIONS

Aff-Wild Valence and Arousal 'in-the-wild' Challange, S. Zafeiriou et al, IEEE (CVPRW), Jul. 2017, pp. 1980-1987 (Year: 2017).*
Compound facial expressions of emotion,Proc. National Academy of Sciences, S. Du et al., 2014, pp. E1454-E1462 (Year: 2014).*
A Morphable Model for the Synthesis of 3D Faces, Volker Blanz et al., ACM, 1999, pp. 187-194 (Year: 1999).*
Categorical and dimensional perceptions in decoding emotional facial expressions, Tomomi Fujimura et al., Cognition and Emotion, 2012, pp. 587-601 (Year: 2012).*
Perceptual and affective mechanisms in facial expression recognition: An integrative review, Manuel G. Calvo et al., Cognition and Emotion, 2015, pp. 1-26 (Year: 2015).*
AffectNet: A Database for facial expression, Valence, and Arousal Computing in the wild, Ali Mollahosseini et al., IEEE, 2017, pp. 1-18 (Year: 2017).*
A. Mollahosseini, B. Hasani, and M. H. Mahoor, "Affectnet: A database for facial expression, valence, and arousal computing in the wild," IEEE Trans. Affective Computing, 2019, pp. 18-31, vol. 10, No. 1.
E. Sariyanidi et al., "Automatic analysis of facial affect: A survey of registration, representation, and recognition," IEEE Trans. Pattern Analysis and Machine Intelligence, Jun. 2015, pp. 1113-1133, vol. 37, No. 6.
F. Benitez-Quiroz et al., "Discriminant functional learning of color features for the recognition of facial action units and their intensities," IEEE Trans. Pattern Analysis and Machine Intelligence, 2018.
J. A. Russell, "A circumplex model of affect," Journal of Personality and Social Psychology, , 1980, p. 1161-1178, vol. 39, No. 6.
O. Rudovic et al., "Context-sensitive dynamic ordinal regression for intensity estimation of facial action units," IEEE Trans. Pattern Analysis and Machine Intelligence, 2015, pp. 944-958, vol. 37, No. 5.
P. Ekman and W.V. Friesen, "Constants across cultures in the face and emotion," Journal of Personality and Social Psychology, 1971, pp. 124-129, vol. 17, No. 2.
S. Du et al., "Compound facial expressions of emotion," Proc. National Academy of Sciences, 2014, pp. E1454-E1462, vol. 111, No. 15.
S. Li and W. Deng, "Deep facial expression recognition: A survey," IEEE Trans. Affective Computing, Mar. 2020.
S. Zafeiriou et al., "Aff-wild: Valence and arousal 'in-thewild' challenge," in Proc. IEEE Computer Vision and Pattern Recognition Workshops (CVPRW), Jul. 2017, pp. 1980-1987.
V. Vonikakis et al., "MorphSet, Augmenting categorical emotion datasets with dimensional affect labels using face morphing," IEEE International Conference on Image Processing 2021, Sep. 19-22, 2021, pp. 1-13.

\* cited by examiner

METHOD OF AUGMENTING A DATASET USED IN FACIAL EXPRESSION ANALYSIS

FIELD OF INVENTION

The present disclosure relates to a computer-implemented method of augmenting a training or testing dataset for a facial expression analysis system.

BACKGROUND

Classification of basic prototypical high-intensity facial expressions is an extensively researched topic. Inspired initially by the seminal work of P. Ekman and W. V. Friesen, "Constants across cultures in the face and emotion," *Journal of Personality and Social Psychology*, vol. 17, no. 2, pp. 124-129, 1971, incorporated herein by reference in its entirety, it has made significant strides in recent years. See E. Sariyanidi et al., "Automatic analysis of facial affect: A survey of registration, representation, and recognition, *IEEE Trans. Pattern Analysis and Machine Intelligence*, vol. 37, no. 6, pp. 1113-1133, June 2015; and S. Li and W. Deng, "Deep facial expression recognition: A survey," *IEEE Trans. Affective Computing*, March 2020, both of which are incorporated herein by reference in their entirety. However, such approaches have limited applicability in real life, where people rarely exhibit high-intensity prototypical expressions; low-key, non-prototypical expressions are much more common in everyday situations. Consequently, researchers have started to explore alternative approaches, such as intensity of facial action units, compound expressions, or dimensional models of facial affect. See O. Rudovic et al., "Context-sensitive dynamic ordinal regression for intensity estimation of facial action units," *IEEE Trans. Pattern Analysis and Machine Intelligence*, vol. 37, no. 5, pp. 944-958, 2015; F. Benitez-Quiroz et al., "Discriminant functional learning of color features for the recognition of facial action units and their intensities," *IEEE Trans. Pattern Analysis and Machine Intelligence*, 2018; S. Du et al., "Compound facial expressions of emotion," *Proc. National Academy of Sciences*, vol. 111, no. 15, pp. E1454-E1462, 2014; J. A. Russell, "A circumplex model of affect," *Journal of Personality and Social Psychology*, vol. 39, no. 6, p. 1161-1178, 1980; A. Mollahosseini, B. Hasani, and M. H. Mahoor, "Affectnet: A database for facial expression, valence, and arousal computing in the wild," *IEEE Trans. Affective Computing*, vol. 10, no. 1, pp. 18-31, 2019; and S. Zafeiriou et al., "Aff-wild: Valence and arousal 'in-thewild' challenge," in *Proc. IEEE Computer Vision and Pattern Recognition Workshops (CVPRVV)*, July 2017, pp. 1980-1987, each of which is incorporated herein by reference in its entirety. Yet these alternatives have not received much attention in the computer vision community compared to categorical models.

One major problem that impedes the widespread use of dimensional models is the limited availability of datasets. This stems from the difficulty of collecting large sets of images across many subjects and expressions. It is even more difficult to acquire reliable emotion annotations for supervised learning. Continuous dimensional emotion labels such as Valence and Arousal are difficult for laymen users to assess and assign and hiring experienced annotators to label a large corpus of images is prohibitively expensive and time consuming. Since even experienced annotators may disagree on these labels, multiple annotations per image are required, which further increases the cost and complexity of the task. Yet there are no guarantees that the full range of possible expressions and intensities will be covered, resulting in imbalanced datasets. Consequently, large, balanced emotion datasets, with high quality annotations, covering a wide range of expression variations and expression intensities of many different subjects, are in short supply.

Accordingly, there exists an unmet need to create balanced, annotated image datasets, appropriate for training and testing Facial Expression Analysis systems for dimensional affect in an efficient and cost-effective manner.

SUMMARY OF THE INVENTION

A first embodiment of the present invention is a computer-implemented method of augmenting a dataset used in facial expression analysis comprising the steps of adding to a dataset a first facial image and a second facial image, mapping the first and second facial images to a first expression point and second expression point respectively in a continuous dimensional emotion space, determining a position of a third expression point in the continuous dimensional emotion space, the third expression point being a position between the first and second expression point, generating an expression variation image assigning a first dimensional label to the expression variation image and optionally adding the expression variation image to the dataset, the expression variation image and first dimensional label are derived from the position of the third expression point, based on its position relative to the first and second facial image.

Optionally, the third expression point is determined by applying an expression distance to the first expression point or second expression point. Optionally, the expression distance is preselected.

Optionally, the first and second facial images are each assigned a label comprising the following expressions: happy, surprised, afraid, angry, disgusted or sad and are mapped to positions that correspond to the labels in the continuous dimensional emotion space. Optionally, the first and second facial images are apex expressions.

Optionally the first embodiment further comprises the step of adding to the dataset, a neutral facial image, mapping the neutral facial image to a neutral point in the continuous dimensional emotion space, determining a first intensity point in the continuous dimensional emotion space, the first intensity point being a position between the neutral facial image and one of: the first facial image, the second facial image or the expression variation image, generating an intensity variation image, assigning a second dimensional label to the first variation image and optionally adding the intensity variation image to the dataset, the intensity variation image and the second dimensional label are based on the first intensity point's relative position between the neutral facial image and the first facial image.

Optionally, the first intensity point is determined by applying an intensity distance to the neutral expression point or the first facial image. Optionally, the intensity distance is preselected. Optionally, the expression variation image is obtained by applying a first morph function to interpolate the first facial image and the second facial image and the intensity variation image is obtained by applying a second morph function to interpolate the neutral image and the first facial image.

An alternative of the first embodiment is a computer-implemented method of augmenting a dataset used in facial expression analysis comprising the steps of adding to a dataset, a neutral facial image and a first facial image, mapping the neutral facial image to a neutral point and the first facial image to a first expression point, the neutral point and first expression point being located in a continuous dimensional emotion space, determining a first intensity point on an intensity plane in the continuous dimensional emotion space, the first intensity point being a position between the neutral facial image and the first expression, generating an intensity variation image and assigning a dimensional label to the intensity variation image, the intensity variation image and the dimensional label are based on the first intensity point's relative position between the neutral facial image and the first facial image.

Optionally, the intensity variation image is obtained by applying a second morph function to interpolate the neutral image and the first facial image.

Optionally, the continuous dimensional emotion space is a valence-arousal circumplex.

An alternative of the first embodiment is a storage medium comprising machine readable instructions stored thereon for causing a computer system to perform a method as described above.

DETAILED DESCRIPTION OF THE INVENTION

In the following detailed description, reference is made to the accompanying drawings, which form a part hereof. The illustrative embodiments described in the detailed description, drawings and claims are not meant to be limiting. Other embodiments can be utilized, and other changes can be made, without departing from the spirit or scope of the subject matter presented herein.

The present invention provides a method of augmenting a dataset used in Facial Expression Analysis systems 100 specifically, by it being premised on the observation that many expression variations can be approximated by generating high-quality morphings between the existing available images of a categorical dataset. While expected to be typically employed to augment training datasets used to train machine learning models used in facial expression analysis, the method can likewise be used to augment a testing dataset.

Figure 1:
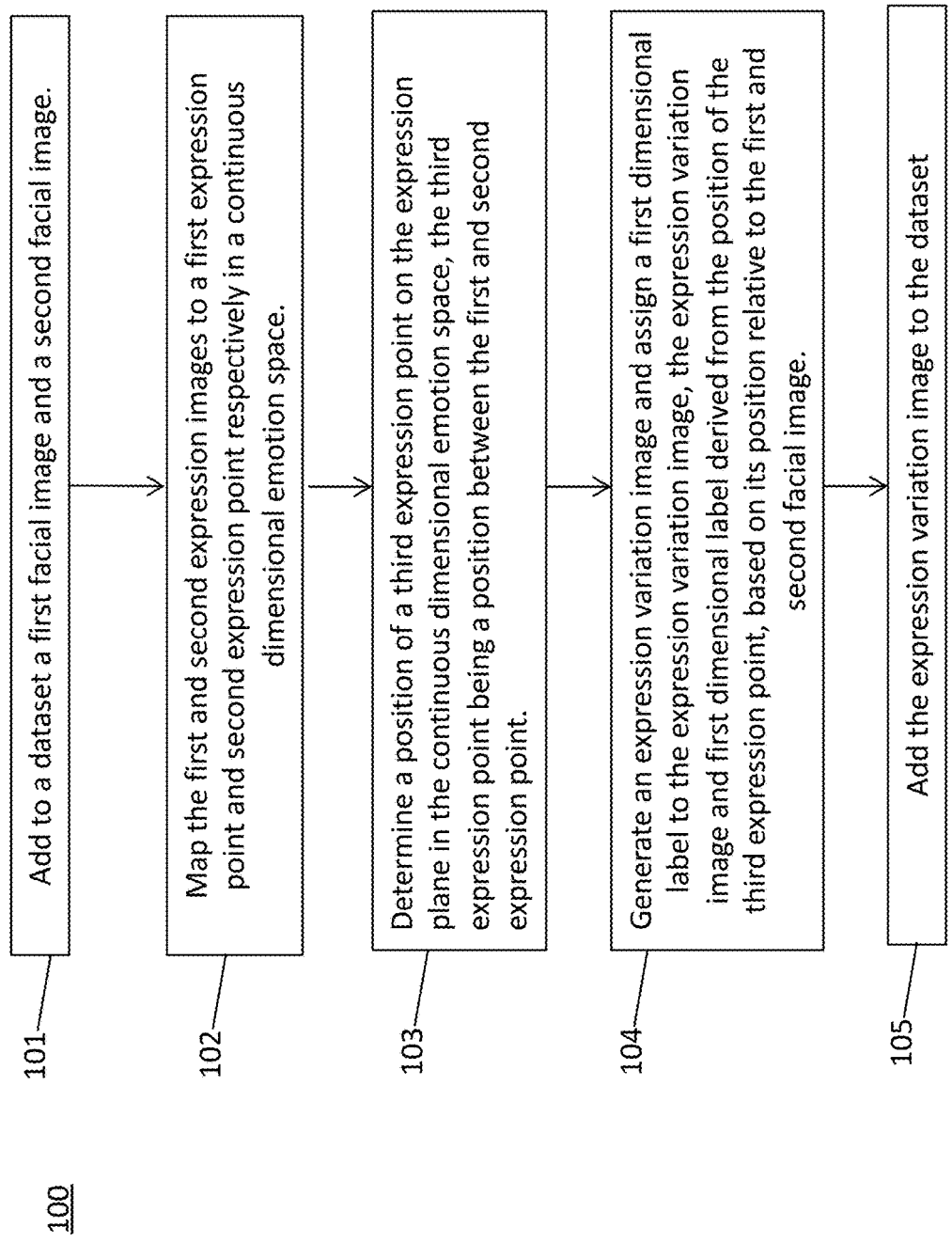
FIG. 1 illustrates a method of augmenting a dataset used in facial expression analysis according to the present invention.

Referring to FIG. 1 and in a first embodiment of the present invention, a first facial image and second facial image are added to a dataset (step 101). Facial images that are added to the dataset typically depict one of seven expressions, namely: Neutral (NE), Happy (HA), Surprised (SU), Afraid (AF), Angry (AN), Disgusted (DI) and Sad (SA), and are already annotated/labelled as such. By way of example, a typical categorical dataset is expected to contain each of the seven expressions per subject. However, it will be readily understood by a person of ordinary skill in the art that the first and second facial image may also be other expressions such as, but not limited to Delighted, or Excited. For the purposes of augmenting expressions, the first and second facial images cannot depict Neutral.

In one embodiment, the first facial image and second facial image both depict an apex expression, meaning the facial expression is a peak intensity.

Figure 2:
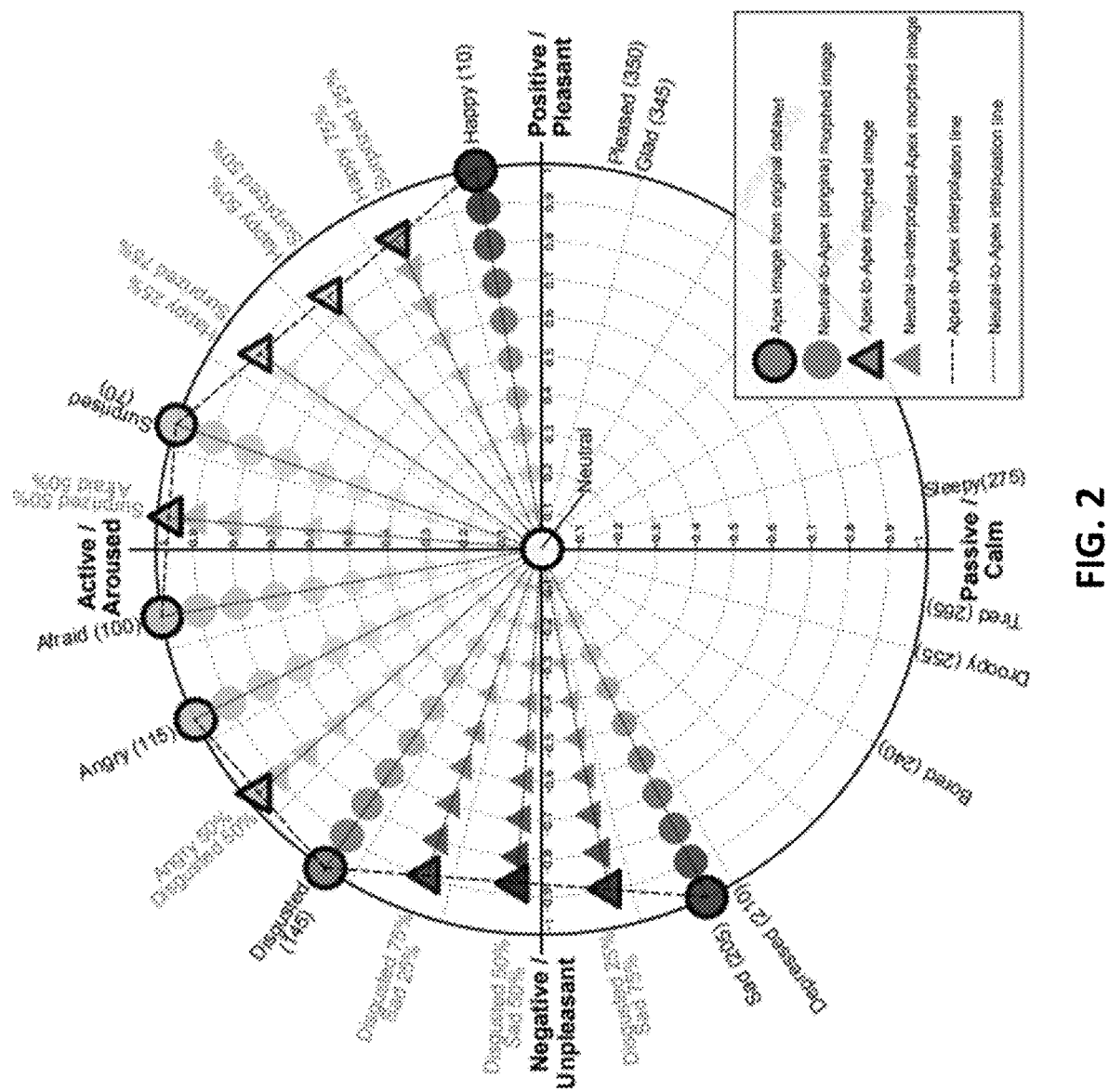
FIG. 2 is a depiction of the augmentation framework according to the present invention in valence-arousal space of the circumplex model.

Referring to FIG. 2, a 2-dimensional polar affective space, similar to the Arousal-Valence (AV) space of the circumplex model, with Neutral at the center is depicted. Distance from the center (i.e. deviation from neutral) represents the intensity of an expression. High intensity expressions (e.g. 'extremely happy') are located at the outer perimeter of the affective space, while low-key expressions (e.g. 'slightly happy') near the center of the space, close to Neutral. Arousal and Valence are in the range of [−1, 1]. Emotions are defined by angles in the interval [0°, 360°], while intensity of expression is defined by the distance from the center (Neutral) and is in the interval [0, 1]. The following assumptions are made. First, one-to-one correspondence of affective coordinates to facial deformations. Second, continuity of the facial deformation space. Third, neighboring affective coordinates have similar facial deformations. Small changes in affective coordinates, result in small changes in the facial deformation space. Lastly, continuity of the dimensional affective space.

The first and second facial images are mapped to a first and second expression point respectively in a continuous dimensional emotion space (step 102). A non-limiting example of a continuous two-dimensional emotion space is the valence-arousal space of the circumplex model which will be discussed further as a non-limiting example.

Since the first and second facial images are already labelled, the first and second expression points can be very specific coordinates in the valence-arousal space of the circumplex model. Referring to FIG. 2, the original dataset images are depicted as outlined circles. It is apparent after mapping a typical dataset with facial images depicting the seven typical facial expressions that there is a lot of empty space in the valence-arousal space.

Next, a position of a third expression point in the continuous dimensional emotion space is determined, the third expression point being a position between the first and second expression point (step 103). In one embodiment, the position of the third expression point is determined by applying an expression distance to either the first or second expression point, so long as the third expression point lies therebetween. In one embodiment, further expression points can be determined by applying the expression distance to the third expression point and so on to obtain a series of expression points between the first and second expression point. Although not strictly required, in one embodiment, the expression distance is preselected based on the specific needs of the training or testing dataset, such as expression granularity, augmentation factor and symmetry between the points. In one embodiment, the expression distance is an angle increment of 15° starting from either the first or second expression point and strikes a balance between the aforementioned criteria. In one embodiment, the expression is preselected. The method as described above can also be applied to a neutral point and any expression image, including the first facial image and second facial image and newly generated images as a result of augmentation such as an expression variation image described below to generate an intensity variation image with the third expression point being analogous to the first intensity point for the purposes of mapping.

In one embodiment, the first and second facial images correspond to points that are immediately adjacent to each other when mapped in the continuous dimensional emotion space. By way of example, and once again referring again to FIG. 2, the emotions, angry and afraid are example of two expressions that are immediately adjacent to each other in the valence arousal space.

With the position of the third expression determined, an expression variation image can be generated, and a first dimensional label can be assigned to the expression variation image, the expression variation image and first dimensional label being derived from the position of the third expression point, based on its position relative to the first and second facial expression (step 104). In a non-limiting example, and assuming a two-dimensional valence arousal space of the circumplex model.

Let $F_i^E$ denote the face image of subject i with facial expression E. For categorical datasets, usually $E \in \{NE,HA, SU,AF,AN,DI,SA\}$. Let $\theta^E$ E denote the specific angle of each expression in the polar valence-arousal space, as estimated from emotion studies. See J. A. Russell, "A circumplex model of affect," *Journal of Personality and Social Psychology*, vol. 39, no. 6, p. 1161-1178, 1980; and G. Paltoglou and M. Thelwall, "Seeing stars of valence and arousal in blog posts," *IEEE Trans. Affective Computing*, vol. 4, no. 1, pp. 116-123, January 2013, each of which is incorporated herein by reference in its entirety. Let $I_i^E \in [0, 1]$ denote the intensity of expression E of subject i. Zero expression intensity $I^e=0$ coincides with NE (by definition $I^{NE}=0$), while $I^E=1$ represents the highest possible intensity of expression. Let $M_p$ ($F_i^{source}$, $F_i^{target}$, r) be a morphing function, based on p facial landmarks, that returns a new face image, which is the result of morphing $F_i^{source}$ towards $F_i^{target}$ with a ratio $r \in [0, 1]$; when r=0 the morphed image is identical to $F_i^{source}$ and when r=1 it is identical to $F_i^{target}$. Any known contemporary morphing approach can be used for this, such as Delaunay triangulation followed by local warping on groups of facial landmarks.

The augmentation method according some aspects the present invention is based on 2 types of morphings. In order to synthesize new expression variations, Apex to Apex morphing (1) is used, between the given apex expressions of the categorical dataset:

$$\text{Apex to Apex} \begin{cases} F_i^{A_1 r A_2} = M_p(F_i^{A_1}, F_i^{A_2}, r) \\ I_i^{A_1 r A_2} = (1-r)I_i^{A_2} + r I_i^{A_2} \\ \theta^{A_1 r A_2} = (1-r)\theta^{A_1} + r\theta^{A_2} \end{cases} \quad (1)$$

Where A, $A_1$ and $A_2$ are apex expressions from the parent dataset, and r is a ratio in the interval [0, 1].

In order to synthesize new intensity variations, Neutral to Apex morphing (2) is used, between the NE image and a given (or interpolated) apex image:

$$\text{Neutral to Apex} \begin{cases} F_i^{rA} = M_p(F_i^{NE}, F_i^{A}, r) \\ I_i^{rA} = r I_i^{A} \\ \theta^{rA} = \theta^{A} \end{cases} \quad (2)$$

Figure 3:
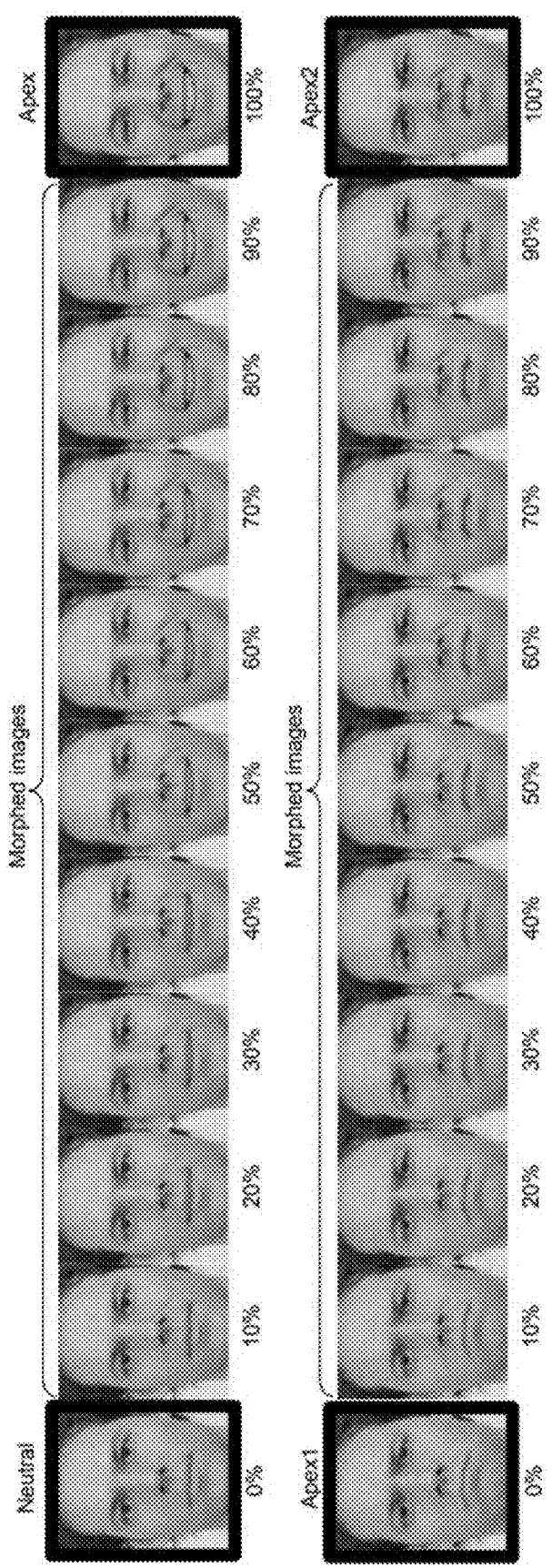
FIG. 3 depicts two types of morphings use to generate expression and intensity variations.

Referring to FIG. 3, examples of these 2 types of morphings are depicted. For every given or generated face image $F_i^E$, with $I_i^E$ and $\theta^E$, the first dimensional label can be computed as $V_i^E = I_i^E \cos(\theta^E) = I$ and $A_i^E = I_i^E \sin(\theta^E)$. In some embodiments, an intensity variation image is generated by applying a intensity distance, the intensity distance being an intensity increment of 0.1. Optionally, both (1) and (2) can both be applied to generated augmented image(s) for both facial expressions and intensity.

Optionally, the expression variation image or expression variation image can be added to the dataset (step 105).

As is traditional in the field of the disclosed technology, features and embodiments are described, and illustrated in the drawings, in terms of various steps. Those skilled in the art will appreciate that these steps are physically implemented by a computer system including one or more computers implemented with electronic (or optical) circuits such as logic circuits, discrete components, microprocessors, hard-wired circuits, memory elements, wiring connections, and the like. The steps may be implemented by a computer-readable storage medium used in conjunction with the one or more computers, and comprising machine readable instructions stored thereon for causing a computer system to perform the steps. In the case of the one or more computers being implemented by microprocessors or similar, they may be programmed using software (e.g., microcode) to perform various functions discussed herein and may optionally be driven by firmware and/or software. Alternatively, certain steps or procedures may be implemented by dedicated hardware, or as a combination of dedicated hardware to perform some functions and a processor (e.g., one or more programmed microprocessors and associated circuitry) to perform other functions. In this sense, the various steps described can be performed automatically to result in a rapid process for performing facial expression analysis or for augmenting a dataset used in performing facial expression analysis.

While example embodiments have been illustrated and described above, it will be apparent to those skilled in the art that modifications and variations could be made without departing from the scope of the present invention as defined by the appended claims.

The invention claimed is:

1. A computer-implemented method of augmenting a dataset used in facial expression analysis, the method comprising the steps of:
    adding to a dataset a first facial image and a second facial image;
    mapping the first and second facial images to a first expression point and second expression point respectively in a continuous dimensional emotion space;
    determining a position of a third expression point in the continuous dimensional emotion space, the third expression point being a position between the first and second expression point;
    generating an expression variation image;
    assigning a first dimensional label to the expression variation image;
    adding the expression variation image to the dataset,
    wherein the expression variation image and first dimensional label are derived from the position of the third expression point, based on its position relative to the first and second facial image;
    generating an intensity variation image based on a neutral facial image and the expression variation image;
    assigning a second dimensional label to the intensity variation image; and
    adding the intensity variation image to the dataset,
    wherein the expression variation image is obtained by applying a first morph function to interpolate the first facial image and the second facial image, and the intensity variation image is obtained by applying a second morph function to interpolate the neutral facial image and the expression variation image.

2. The method according to claim 1, wherein the third expression point is determined by applying an expression distance to the first expression point or second expression point.

3. The method according to claim 2, wherein the expression distance is preselected.

4. The method according to claim 1, wherein the first and second facial images are each assigned a label from one of the following expressions: happy, surprised, afraid, angry, disgusted, or sad, and are mapped to positions that correspond to the labels in the continuous dimensional emotion space.

5. The method according to claim 1, wherein the first and second facial images are apex expressions.

6. The method according to claim 1, further comprising the step of:
adding to the dataset, the neutral facial image;
mapping the neutral facial image to a neutral point in the continuous dimensional emotion space; and
determining a first intensity point in the continuous dimensional emotion space, the first intensity point being a position between the neutral point and the third point:
wherein the intensity variation image and the second dimensional label are based on the first intensity point's relative position between the neutral point and the third expression point.

7. The method according to claim 6, wherein the first intensity point is determined by applying an intensity distance to the neutral point.

8. The method according to claim 7, wherein the intensity distance is preselected.

9. A non-transitory storage medium comprising machine readable instructions stored thereon for causing a computer system to perform a method according to claim 1.

10. A computer-implemented method of augmenting a dataset used in facial expression analysis comprising the steps of:
adding to a dataset, a neutral facial image, a first facial image, and a second facial image;
mapping the neutral facial image to a neutral point, the first facial image to a first expression point, and the second facial image to a second expression point, the neutral point, the first expression point, and the second expression point being located in a continuous dimensional emotion space;
determining a position of a third expression point in the continuous dimensional emotion space, the third expression point being a position between the first and second expression point;
determining a first intensity point on an intensity plane in the continuous dimensional emotion space, the first intensity point being a position between the neutral facial image and the third expression point;
generating an intensity variation image; and
assigning a dimensional label to the intensity variation image;
wherein the intensity variation image and the dimensional label are based on the first intensity point's relative position between the neutral facial image and the third expression point.

11. The method according to claim 10, wherein the intensity variation image is obtained by applying a morph function to interpolate the neutral facial image and an expression variation image corresponding to the third expression point.

12. The method according to claim 11, wherein the continuous dimensional emotion space is a valence-arousal circumplex.

13. A non-transitory storage medium comprising machine readable instructions stored thereon for causing a computer system to perform a method according to claim 10.

14. The method of claim 11, wherein the expression variation image is a morphed image derived from the position of the third expression point, based on its position relative to the first expression point and the second expression point.

* * * * *